US009432381B2

(12) United States Patent
Dyor et al.

(10) Patent No.: US 9,432,381 B2
(45) Date of Patent: Aug. 30, 2016

(54) MANAGED DISSEMINATION OF LOCATION DATA

(75) Inventors: Matthew Graham Dyor, Bellevue, WA (US); Pablo Tapia, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 12/958,325

(22) Filed: Dec. 1, 2010

(65) Prior Publication Data

US 2012/0144452 A1   Jun. 7, 2012

(51) Int. Cl.
*H04L 29/06* (2006.01)
*H04W 4/02* (2009.01)
*H04W 12/08* (2009.01)
*H04W 48/04* (2009.01)
*H04W 4/20* (2009.01)

(52) U.S. Cl.
CPC ......... *H04L 63/107* (2013.01); *H04L 63/0884* (2013.01); *H04L 63/108* (2013.01); *H04W 4/02* (2013.01); *H04W 4/023* (2013.01); *H04W 4/025* (2013.01); *H04W 12/08* (2013.01); *H04W 48/04* (2013.01); *H04W 4/20* (2013.01)

(58) Field of Classification Search
CPC . H04L 63/107; H04L 63/108; H04L 63/102; H04L 63/10; H04L 63/08; H04L 63/0876; H04W 12/06; H04W 12/08; H04W 4/02; H04W 4/023; H04W 4/025; H04W 48/04; H04W 48/02
USPC ...... 726/4, 5, 7, 27, 29; 340/539.11, 539.13; 455/410, 456.1, 456.3
See application file for complete search history.

(56) References Cited

U.S. PATENT DOCUMENTS

| 6,823,188 | B1 | 11/2004 | Stern |
| 6,825,767 | B2* | 11/2004 | Humbard ................ 340/573.1 |
| 7,503,074 | B2* | 3/2009 | Dublish et al. ............... 726/27 |
| 7,826,830 | B1* | 11/2010 | Patel et al. ................ 455/414.1 |
| 7,840,226 | B1* | 11/2010 | Walsh et al. ............... 455/456.1 |
| 8,316,419 | B2* | 11/2012 | Oulahal ......................... 726/4 |
| 2002/0118118 | A1* | 8/2002 | Myllymaki et al. ....... 340/686.1 |
| 2003/0037110 | A1* | 2/2003 | Yamamoto .................... 709/204 |
| 2005/0114694 | A1* | 5/2005 | Wager et al. ................. 713/200 |
| 2006/0058045 | A1 | 3/2006 | Nilsen |
| 2007/0281689 | A1* | 12/2007 | Altman et al. ............. 455/435.1 |
| 2008/0299989 | A1* | 12/2008 | King et al. ................ 455/456.1 |
| 2009/0275348 | A1 | 11/2009 | Weinreich et al. |

(Continued)

OTHER PUBLICATIONS

Treu et al. "Implicit Authorization for Accessing Location Data in a Social Context", Second International Conference on Availability, Reliability and Security (ARES '07). IEEE Computer Society, 2007. 8 pgs.*

(Continued)

*Primary Examiner* — Zachary A Davis
(74) *Attorney, Agent, or Firm* — Steve Wight; Sandy Swain; Micky Minhas

(57) ABSTRACT

A location provider manages dissemination of location data of a user to one or more third-party services, so that the user can take advantage of services offered by the third parties, without the associated burden of continuously granting or denying requests by the third party services to obtain location data of the user. A third-party service can obtain location information of a user from the location provider. Users may control circumstances in which the location provider is to share location data of the user with the one or more third-party services.

20 Claims, 9 Drawing Sheets

(56) References Cited

U.S. PATENT DOCUMENTS

| | | | |
|---|---|---|---|
| 2010/0057481 A1 | 3/2010 | Fein et al. | |
| 2010/0250727 A1* | 9/2010 | King et al. | 709/224 |
| 2010/0251340 A1* | 9/2010 | Martin et al. | 726/4 |
| 2011/0077021 A1* | 3/2011 | Mizikovsky et al. | 455/456.1 |
| 2011/0159845 A1* | 6/2011 | Sanjeev | 455/411 |

OTHER PUBLICATIONS

U.S. Appl. No. 12/821,264, filed Jun. 23, 2010, Henry N. Jerez Morales; Matthew Graham Dyor; Joe Abou Rjeili; Rony Ferzli; "Location Brokerage System."

Amir, et al. "Buddy tracking—efficient proximity detection among mobile friends", retrieved on Aug. 30, 2010 at <<http://www.ieee-infocom.org/2004/Papers/07_4.PDF>>, IEEE INFOCOM, Hong Kong, Mar. 2004, pp. 298-309.

Gruteser, et al., "Anonymous Usage of Location-Based Services Through Spatial and Temporal Cloaking", Retrieved at <<http://citeseerx.ist.psu.edu/viewdoc/download?doi=10.1.1.85.3772&rep=rep1&type=pdf >>,International Conference on Mobile Systems, Applications and Services, Proceedings of the 1st international conference on Mobile systems, applications and services, May 5-8, 2003, pp. 1-12.

Gruteser, et al., "Protecting Privacy in Continuous Location-Tracking Applications", Retrieved at << http://ieeexplore.ieee.org/stamp/stamp.jsp?tp=&arnumber=1281242 >>, IEEE Security and Privacy, vol. 2, No. 2, Mar. 2004, pp. 28-34.

Hinze, et al., "Event-Based Communication for Location-Based Service Collaboration", Retrieved at << http://crpit.com/confpapers/CRPITV92Hinze.pdf >>, Database Technologies 2009, Twentieth Australasian Database Conference (ADC), Jan. 20-23, 2009, pp. 10.

"Introduction to Fire Eagle", Retrieved at <<http://fireeagle.yahoo.net/developer/documentation >>, Retrieved Date: Sep. 15, 2010, pp. 1-3.

McIntyre, "Facebook Launches Location-Based Service", retrieved on Aug. 30, 2010 at <<http://www.dailyfinance.com/story/facebook-launches-location-based-service/19599829/>>, AOL Inc., DailyFinance, Aug. 19, 2010, pp. 1-6.

Roxin, et al., "Middleware Models for Location-Based Services: A Survey", Retrieved at <<http://wicat.sys.virginia.edu/ICPS_08/aupc/p35.pdf >>, ICPS, Proceedings of the 2nd international workshop on Agent-oriented software engineering challenges for ubiquitous and pervasive computing, Jul. 6, 2008, pp. 35-40.

Schutzer, "The CTO Corner: Location-based Service", retrieved on Aug. 30, 2010 at <<http://www.bitsinfo.org/downloads/Publications%20Page/CTOCornerAugust2010.pdf>>, BITS Roundtable Technology Group, Aug. 2010, pp. 1-6.

Siksnys, et al., "A Location Privacy Aware Friend Locator", retrieved on Aug. 30, 2010 at <<http://www4.comp.polyu.edu.hk/~csmlyiu/SSTD09_friendloc.pdf>>, Proceedings of International Symposium on Spatial and Temporal Databases (SSTD), Aalborg, Denmark, Jul. 2009, pp. 405-410.

Tikamdas, et al., "Direction-based Proximity Detection Algorithm for Location-based Services", retrieved on Aug. 30, 2010 at <<http://ieeexplore.ieee.org/stamp/stamp.jsp?tp=&arnumber=5010506>>, IEEE Press, Proceedings of International Conference on Wireless and Optical Communications Networks, Cairo, Egypt, 2009, pp. 26-30.

Titkov, et al., "Privacy Conscious Brokering in Personalised Location-Aware Applications", Retrieved at << http://delivery.acm.org/10.1145/870000/860834/p1138-titkov.pdf?key1=860834&key2=9979561721&coll=GUIDE&dl=GUIDE&CFID=86790165&CFTOKEN=88657919 >>, International Conference on Autonomous Agents, Proceedings of the second international joint conference on Autonomous agents and multiagent systems, Jul. 14-18, 2003, pp. 1138-1139.

Zundt, et al., "Realizing Peer-to-Peer Location-Based Services in Mobile Networks", retrieved on Aug. 30, 2010 at <<http://www.wpnc.net/fileadmin/WPNC05/Proceedings/Realizing_Peer-to-Peer_Location-Based_Services_in_Mobile_Networks.pdf>>, Proceedings of Workshop on Positioning, Navigation and Communication (WPNC), 2005, pp. 175-182.

* cited by examiner

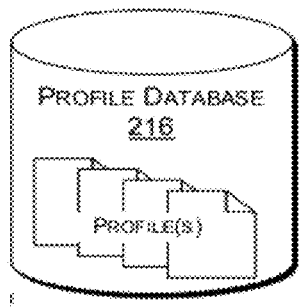

PROFILE 500

AUTHENTICATION INFORMATION 502
    USER NAME: JOE SMITH    PASSWORD: *******
    EMAIL ADDRESS(ES): Joe@domain.com
    HOME PHONE: 555-555-5555
    MOBILE PHONE: 555-777-7777

PREFERENCES 504
SCHEDULE 510:    ⦿ SYNCH WITH CALENDAR    ○ CREATE CUSTOM CALENDAR

SOCIAL CONNECTIONS 512:
⦿ CONTACTS    ○ CALL LOGS    ○ EMAIL LOGS    ○ SMS LOGS
⦿ SOCIAL NETWORKING SITES AS FOLLOWS:
    ⦿ NETWORKING SITE 1
    ⦿ NETWORKING SITE 2

LOCATION TRACKING SETTINGS 514:
⦿ PERIODIC TRACKING, EVERY:  ○ 5 MIN  ○ 15 MIN  ⦿ 30 MIN  ○ 1 HOUR  ○ OTHER
⦿ TRACKING ON EVENT:    ⦿ TOWER HANDOFF  ⦿ POWER ON/OFF  ⦿ APP LAUNCH

VISIBILITY PROFILES 506
⊟ HIGH VISIBILITY PROFILE 516:
    WHEN:  ○ ALWAYS  ○ NEVER  ○ ALWAYS ASK
            ⦿ ALWAYS, EXCEPT AT:  ⦿ SPECIFIED LOCATIONS  ⦿ SPECIFIED TIMES
            ○ NEVER, EXCEPT AT:  ○ SPECIFIED LOCATIONS  ○ SPECIFIED TIMES
    WHAT:  ⦿ APPROXIMATE LOCATION DATA (E.G., BASED ON CELL TOWER)
            ⦿ COORDINATE LOCATION DATA (E.G., BASED ON GPS DATA)
            ⦿ PROXIMITY DATA
            ⦿ SOCIAL CONNECTIONS:  ⦿ ALL  ○ SPECIFIED SOURCES
            ⦿ PREFERRED LOCATIONS
            ⦿ DEMOGRAPHIC DATA

⊞ LOW VISIBILITY PROFILE 518: (CURRENTLY SET AS DEFAULT)

AUTHORIZATION INFORMATION 508
⦿ 3$^{RD}$ PARTY SERVICE 102(1) -- VISIBILITY:  ⦿ HIGH  ○ LOW  ○ CUSTOM
⦿ 3$^{RD}$ PARTY SERVICE 102(2) -- VISIBILITY:  ⦿ HIGH  ○ LOW  ○ CUSTOM
⋮
⦿ 3$^{RD}$ PARTY SERVICE 102(N) -- VISIBILITY:  ○ HIGH  ⦿ LOW  ○ CUSTOM

FIG. 5

MANAGED DISSEMINATION OF LOCATION DATA

BACKGROUND

Finding the location of a person is becoming increasingly more accessible through the pervasive use of mobile devices. A reliable proxy for an individual's location is that of a device (mobile or fixed) that is associated with the individual or that can detect the presence of the individual. Examples of such devices include a user's mobile device, a user's workstation, a key card reader that a user swipes, etc. Existing location systems are generally geared towards creating a social network of individuals that give each other access to location data. The actual calculation of location data, storage of location data preferences, and the security of a user's location data remains the responsibility of each of these disparate services. Each of these services typically requests permission before accessing or sharing the user's location data. As the number of services that rely on a user's location data increases, the burden on the user to grant permission (or not) to these various services becomes substantial.

Further, many services run as applications on a mobile device. Even with improving processing power, battery life, and system architectures, mobile devices are not suited for certain types of location-based services, such as person-to-person proximity services. This problem is amplified when the number of proximity subscriptions (e.g., the number of people for whom an individual wants to be notified when proximate) increases.

BRIEF SUMMARY

This Summary is provided to introduce simplified concepts of management of location information, which are further described below in the Detailed Description. This summary is not intended to identify essential features of the claimed subject matter, nor is it intended for use in determining the scope of the claimed subject matter.

This disclosure relates to techniques for managing dissemination of location data to one or more third-party services. Generally, a location provider maintains user location data. In one example, a location provider may be configured to provide user location data to one or more third-party services, which have permission to access the user location data.

This disclosure also describes techniques by which a third-party service can obtain location information of a user from a location provider. In one example, the third-party application may cause an authentication credential to be provided to the location provider, indicating that the third-party service has permission to access location data of the user. The third-party application then may request and obtain some or all of the location data of the user from the location provider.

This disclosure also describes techniques that control circumstances under which a location provider is to share location data of the user with one or more third-party services. In one example, an authorization may be sent to the location provider specifying one or more third-party services that are allowed to obtain location data of the user and, for each third-party service, a portion of the location data of the user that the respective third-party application is allowed to obtain.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 5 is a schematic diagram of an illustrative user profile that may be stored in a profile database of a location provider.

DETAILED DESCRIPTION

Overview

As noted above, many services today rely on location data of users to perform various operations, such as showing the user's location on a map, tagging photographs with location coordinates, making dinner reservations, or the like. As the number of services that rely on a user's location data increases, the burden on the user to grant or deny permissions to these various services becomes substantial. Also, certain types of existing location services, such as person-to-person proximity services, are problematic due to their relatively high power consumption requirements. This problem is amplified when the number of proximity subscriptions (e.g., the number of people for whom an individual wants to be notified when proximate) increases.

This application describes techniques for managing dissemination of location data to one or more third-party applications or services. Generally, a user may authorize a location provider to maintain location data of the user and to provide aspects of the user data to one or more third-party services. As used herein, "third party services" are services implemented by one or more third-party applications running on local and/or remote computing devices. The location provider manages dissemination of location data of the user to one or more third-party services, so that the user can take advantage of services offered by the third parties, without the associated burden of continuously granting or denying requests by the potentially disparate third party services to obtain location data of the user.

This disclosure also describes techniques by which a third-party service can obtain location information of a user from a location provider, and techniques that control circumstances in which a location provider is to share location data of the user with one or more third-party services.

Illustrative Environment for Management of User Location Data

Figure 1:
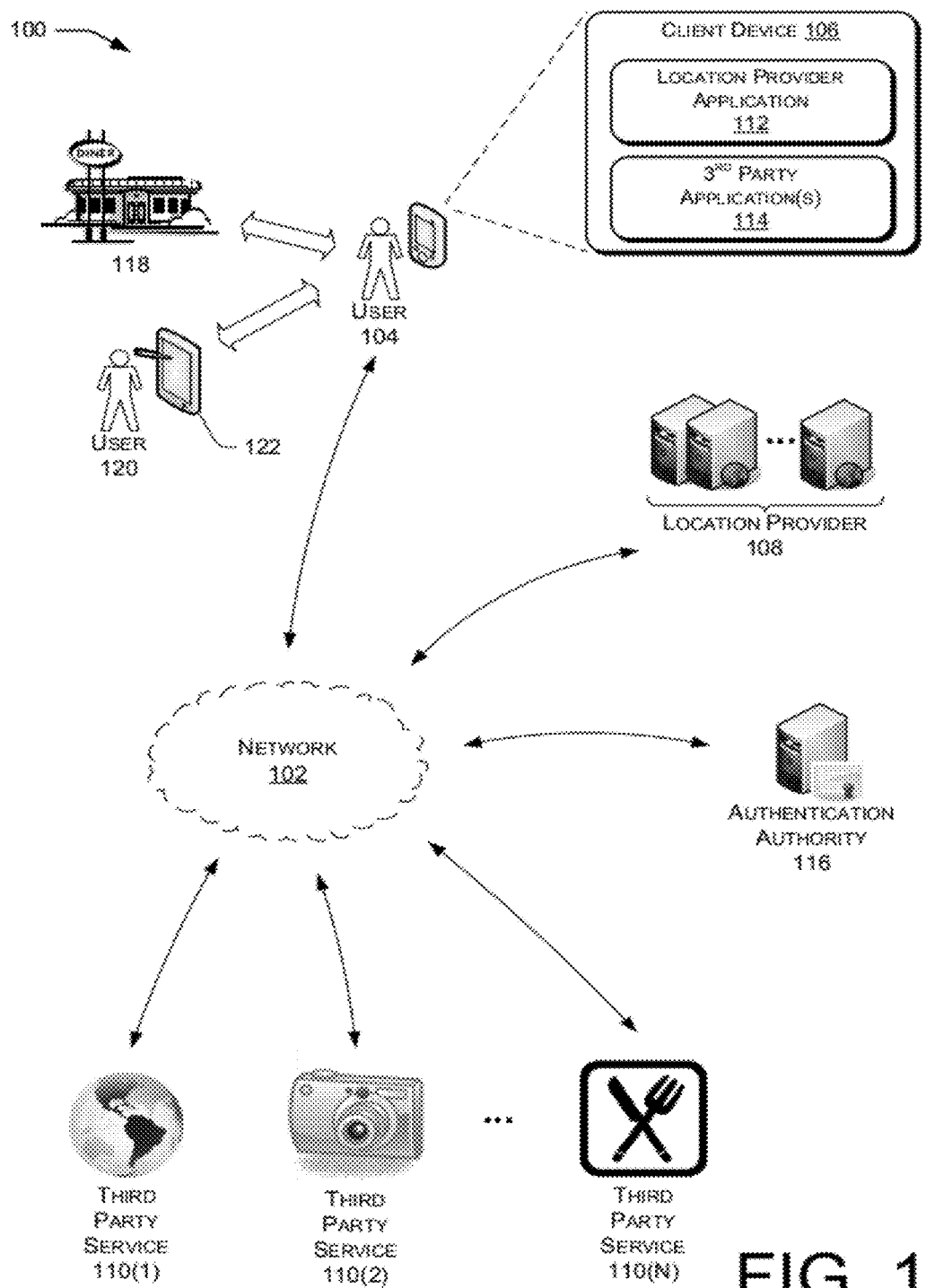
FIG. 1 is a schematic diagram of an illustrative environment usable to manage user location data.

FIG. 1 is a schematic diagram of an illustrative environment 100 including a system usable to manage user location data. The various computing devices and services shown in FIG. 1 are communicatively coupled by a wired and/or wireless communication network 102. By way of example and not limitation, the communication network may include the Internet, one or more wide area networks (WANs), local area networks (LANs), and/or personal area networks (PANs), and the various computing devices and services of FIG. 1 may be coupled to the communication network using known communication connections and protocols.

In the illustrated example, a user 104 uses a client computing device or "client device" 106 to interact with a remote location provider 108 and one or more third-party services 110(1), 110(2), . . . 110(N) (collectively 110) via the network 102. The third-party services 110 in this example include a map third-party service 110(1), a photo tagging third-party service 110(2), and a restaurant third party service 110(N). However, in other examples, third-party services 110 may provide functionality to perform any desired task or function.

In the illustrated example, the client device 106 includes a location provider application 112 and one or more third-party applications 114 stored in memory of the client device 106. The location provider application 112 in this example is a client application resident on the client device 106 that interacts with a backend service at the remote location provider 108 via the network 102. For example, the location provider application 112 may display a graphical user interface to the user 104, by which the user may create an account with the location provider 108 and instruct the location provider 108 how to manage dissemination of the user's location data. Likewise in this example, the third party application(s) 114 resident on the client device 106 provide a user interface and other functionality that allow the user to interact with corresponding backend services, namely the third party services 110, and vice versa. However, in other implementations, the user 102 may interact with the location provider 108 and/or the third party services 110 without the need for corresponding applications resident on the client device. For example, the user 102 might access the location provider 108 and/or the third party services 110 over the network using a browser of the client device. In still other implementations, one or more third party services may be implemented as a third party application resident entirely on the client device 106 (i.e., without any corresponding backend application running on a remote computing device).

The third-party services 110 may obtain user location data from the location provider 110, including approximate location data (e.g., based on a cell tower or other network access point through which the client device 106 is accessing the network), accurate geographic data (e.g., from a global positioning satellite (GPS) receiver of the client device 106), proximity data of the user 104 relative to one or more locations (e.g., restaurant 118), and/or proximity data of the user 104 relative to one or more other users (e.g., user 120) or client devices (e.g., client device 122).

Example User-to-Location Proximity Scenario

Consider the following example scenario with reference to the environment 100 of FIG. 1. User 104 may use client device 106 to access location provider 108 to create an account with the location provider 108. During account creation, the location provider 108 may store authentication information of the user. Subsequent access to the account may require an authentication credential, such as a user name and password, a token, a certificate, a key, a biometric signature, or other security credential.

The user 104 may entrust the location provider 108 to store his or her location data (e.g., location data from a cellular network provider and/or location data captured by the client device itself), preferred locations (e.g., frequently visited locations and/or locations identified as being preferred), schedule information (e.g., meetings, work schedule, reminders, to do lists, and/or calendar entries), visibility profiles (e.g., conditions under which the user wants his or her location to be made available), and/or social connections (e.g., contacts, incoming and outgoing call logs, text message logs, and/or connections on one or more social networking sites). The user 104 may also designate whether and to what extent his or her location data should be shared with one or more third-party services, such as third party services 110.

The user 104 may also sign up with one or more of the third party services 110 in order to obtain functionality of the services. For example, the user 104 may choose to sign up for the restaurant third-party service 110(N). The restaurant third-party service may, for example, notify the user 104 when the user is nearby a particular restaurant 118. To do so, however, the restaurant third-party service 110(N) may need access to the user's location data. The restaurant third-party service 110(N) may further be able to make a reservation for the user 104 at the restaurant. To do so, however, the restaurant third-party service 110(N) may need access to the user's schedule information and/or social connections in order to identify times for the reservation and names of other potential attendees.

Once the user 104 signs up with the third-party service 110, the third party service 100 may prompt the user 104 for permission to obtain user location data, schedule data, and/or social connections from the location provider 108. In order to obtain access to the user's location data, the third-party service 110 can request that the user 104 provide the authentication credential usable to access the location provider 108. In some implementations, the third-party service 110 may request that the user 104 provide the authentication credential to the third-party service 110 for provision to the location provider 108. However, in other implementations, the third-party service 110 may indirectly request that the user 104 provide the authentication credential to the location provider 108. Indirectly requesting the authentication credential means that the third-party service 110 does not receive the location provider authentication credential, but the third-party service 110 does facilitate the process of allowing the user 104 to provide the authentication credential. An example of indirectly requesting an authentication credential is Secure Cross-Domain Communication in the Browser, in which the third-party service 110 opens a browser of the client device 106, through which the user 104 provides the authentication information to the location provider 108. Alternatively, the third-party service 110 may request that the user 104 log into the location provider 108 and add the third-party service 110 to a list of services having permission to access the user's location data. In yet another alternative, the authentication credential may be sent to the location provider 108 by an independent authentication authority 116 at the request of the user 104 or the third-party service 110.

The authentication credential may be provided to the location provider 108 (in any of the foregoing or other manners) prior to, contemporaneously with, or after the third-party service 110 requesting access to location data of the user 104. In response to the request for access to location data of the user 104, the user 104 may grant the third-party service 110 one-time, temporary, or a permanent access to the user's location data. If the grant is for temporary access to location data of the user 104, the user 104 can select a period of time to grant access. Otherwise, a default value may be used. If the grant is for permanent access to location data of the user 104, the location provider 108 may register the third-party service 110 as one that can access the user's location at any time. In this latter case, the third-party service 110 will be granted access on demand (e.g., upon sending each request) and/or may be allowed to subscribe to one or more location events or event streams. As described in more detail below, location events occur when certain conditions are met (e.g., when the user is proximate to a location, when the user is proximate to another user). The user 104 can revoke the access grant at any time.

In some instances, the user 104 may authorize the location provider 108 to grant one or more third-party services 110 permission to access location of the user 104 based on implicit as well as explicit instructions. Explicit instructions are those expressly received from the user 104 after authentication (e.g., after logging into his or her account with the location provider 108). Implicit instructions are those that are inferred based on previous explicit instructions from the user 104, such as previous explicit grants of permission to other similar third-party services, previous explicit grants of permission to access a certain types of user location information, previous explicit grants of permission to other third-party services by a same developer or administrator, etc. For example, if the user 104 previously provided explicit instructions to grant access to multiple services developed by a developer, the location provider 108 may infer from the user's previous actions (i.e., implicit instructions) that the user 104 also wishes to provide access to a new service developed by the same developer. However, the location provider 108 will not grant permissions based on implicit instructions unless the user 104 has expressly instructed the location provider 108 to grant permissions based on such implicit instructions.

Upon registering the third-party service 110 with the location provider 108, if the user 104 has configured more than one visibility profile with the location provider 108, the user 104 may be prompted to select a visibility profile to be used with the third-party service 110. Otherwise, if no visibility profile is selected, or if the user 104 has not established multiple visibility profiles, a default visibility profile (e.g., always visible, never visible, low visibility, etc.) can be used. Additionally or alternatively, the user 104 may be given an opportunity to establish a new visibility profile, in which case the new visibility profile is stored by the location provider 108 so that it can be applied to other the third-party applications. When established, visibility profiles may also specify whether preferred locations, social connections, and/or demographic data are to be shared with the third-party service 110.

Once the restaurant third-party service 110(N) has been provided access to location data of the user, the restaurant third-party service 110(N) may notify the user when he or she is proximate to the restaurant 118. If provided with access to social contacts and schedule information of the user 104, restaurant third-party service 110(N) may also prompt the user to make dinner reservation at the restaurant 118 at one or more times open on the user's calendar with one or more contacts in the user's social connections (perhaps people that live nearest the restaurant or people with whom the user has dined at the restaurant in the past).

Example User-to-User Proximity Scenario

In the event that a third-party service 110 requests user-to-user proximity location data, the location provider 108 may require that the third-party service 110 have permission from both users (e.g., user 104 and user 120) to access their location data. As discussed above, this permission may be obtained based on explicit instructions or implicit instructions. Again, users give explicit permission to the third-party service 110 by providing authentication credentials so that the third-party service 110 can request access to the location provider 108. On the other hand, an implicit instruction granting permission may be inferred (assuming the user 104 has enabled implicit instructions), if the user 104 who has granted access to the third-party service 110 has a social connection (e.g. friend or contact) who has allowed visibility of his/her location to the user 104 and his or her third-party applications 110. Another user-to-user proximity scenario can occur where a user makes himself/herself publicly visible (perhaps time-limited), granting the location provider 108 and third-party applications 110 registered with the location provider 108 access to his/her location data. This last scenario allows for an individual to obtain notifications of the presence of another individual who may be a stranger, but, for example, has similar interests or has otherwise been identified by a third-party application 110 as being of interest to the user.

Example Location Provider

Figure 2:
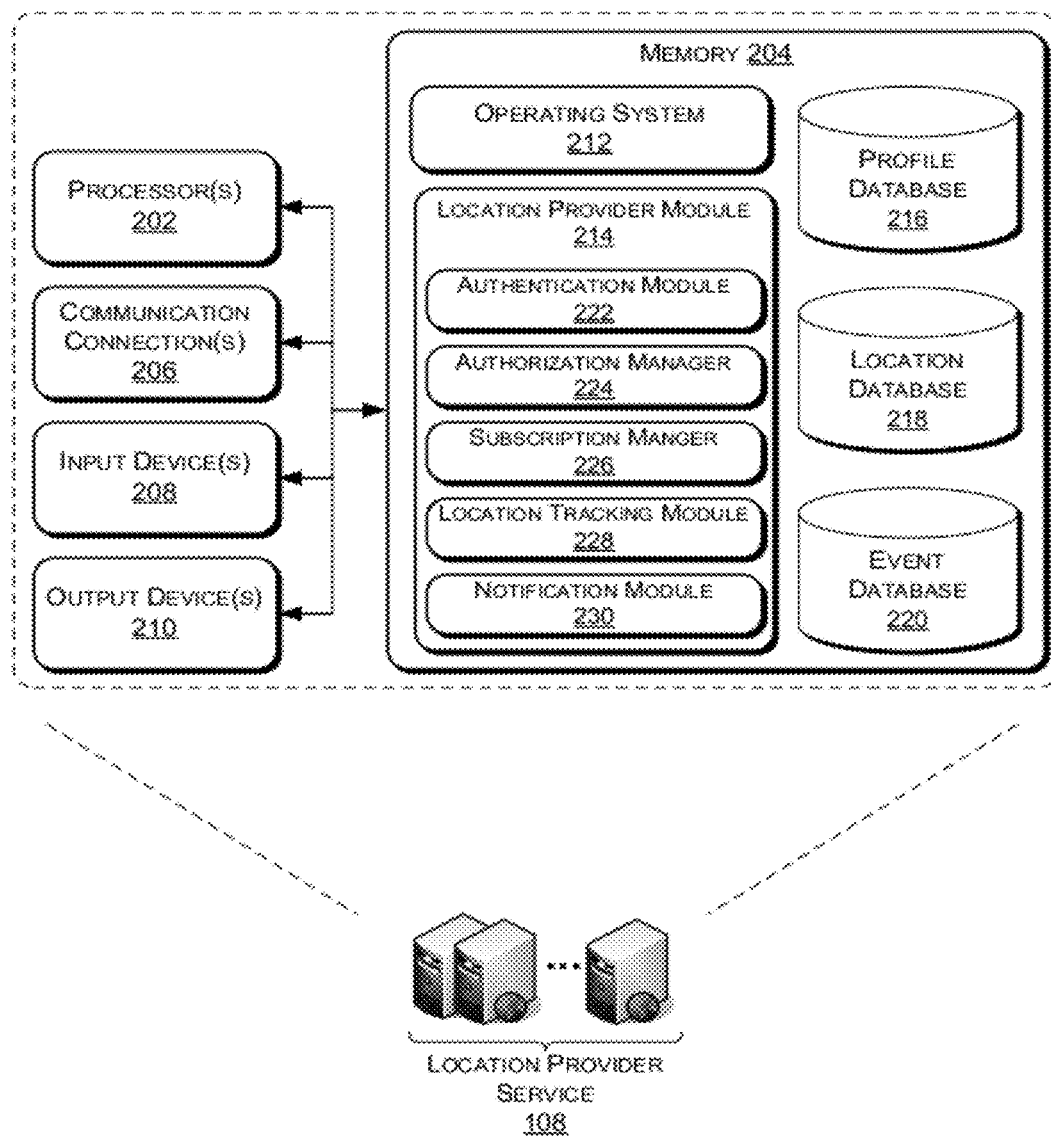
FIG. 2 is a block diagram of an illustrative location provider service capable of managing and providing user location data.

FIG. 2 is a block diagram of an illustrative location provider, such as the location provider 108 of FIG. 1. The location provider 108 may be configured as any suitable computing device capable of implementing a location provider service. By way of example and not limitation, suitable computing devices may include personal computers (PCs), servers, server farms, datacenters, combinations of these, or any other computing device(s) capable of storing and executing all or part of the location provider service.

In one illustrative configuration, the location provider 108 comprises one or more processors 202 and memory 204. The location provider 108 may also contain communications connection(s) 206 that allow the location provider 108 to communicate with client devices 106 and 122, third-party services 110, authentication authority 116, and/or other devices on the network 102. The location provider 108 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

The memory 204 may store program instructions that are loadable and executable on the processor(s) 202, as well as data generated during the execution of and/or usable in conjunction with these programs. In the illustrated example, memory 204 stores an operating system 212, a location provider module 214, a profile database 216, a location database 218, and an event database 220. The operating system 212 provides basic system functionality of the location provider 108 and, among other things, provides for operation of the other programs and modules of the location provider.

The location provider module 214 further includes an authentication module 222, an authorization manager 224, a subscription manager 226, a location tracking module 228, and a notification module 230. In distributed implementations, location provider module 214 (and each of its constituent modules) may serve as a backend, which interfaces with a counterpart front end location provider application 112 at the client device 104. However, in purely web-based implementations, the location provider module 214 may perform all the functions of the location provider service, thereby obviating the need for the client side location provider application 112 entirely. In that case, the location provider module 214 may be configured to render user interface screens, and to serve those screens to a browser of the client device 104 via the network 102.

When an account is created with the location provider 108, the authentication module 222 establishes authentication information for a user of the account and stores the authentication information in the profile database 216. During use, the authentication module 222 compares authentication credentials received with the established authentication information of the user, to determine whether a requesting entity has permission to access the user's location data.

The authorization manager 224 provides an interface by which the user can provide an authorization specifying one or more third-party services having access to obtain location data of the user and, for each third-party application, a portion of the location data of the user that the respective third-party application has permission to obtain. The authorization manager 224 then stores these authorizations in the profile database 216 along with the authentication information. The authorization manager 224 further updates the profile database 216 upon receipt of new and/or updated authorizations.

The subscription manager 226 provides an interface, by which users and/or third-party services can establish and subscribe to one or more location events. The subscription manager 226 stores the events in one or more event logs in the event database 220. The subscription manager 226 further keeps track of which third-party services are subscribed to each event.

The location tracking module 228 tracks current locations of users that have accounts with the location provider 108 according to the information stored in the user's profile. For example, a user profile may specify that that location provider is to track the user's location according to certain location tracking settings (e.g., only at certain times and/or locations, not at certain times and/or locations, track location periodically, or track location upon specified events). Current location of each user is stored in the location database 218.

The notification module 230 monitors current locations of each user in the location database 218 and compares the current locations to events stored in the event database 220 related to the respective user. When the current location of a user satisfies the conditions of an event, the notification module 230 notifies any third party-services subscribed to the event. For example, in the user-to-location scenario given above, when the location of the user 104 falls within a predetermined proximity of the restaurant 118, the notification module notifies the restaurant third-party application 110(N) of the occurrence of the event.

Example Third-Party Service

Figure 3:
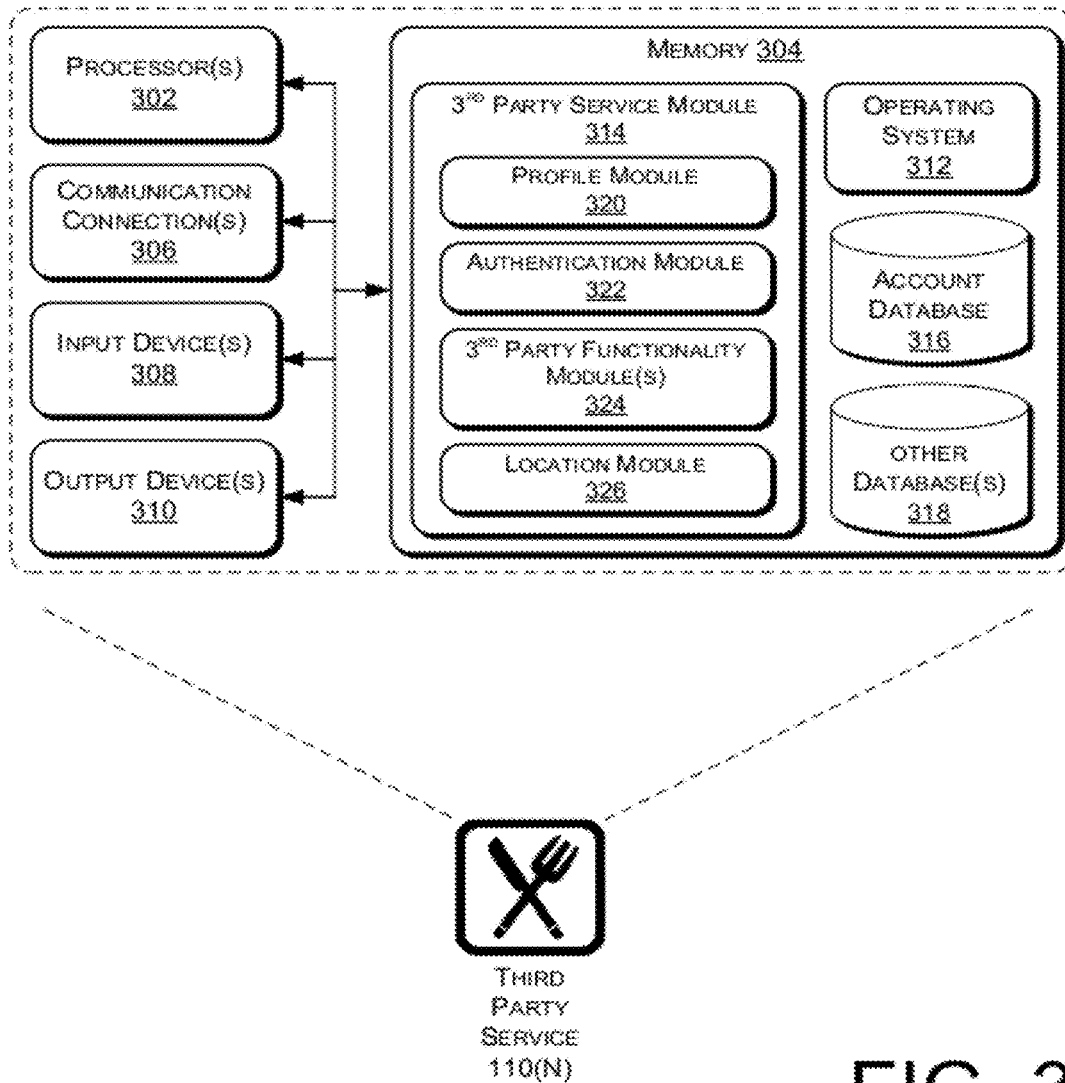
FIG. 3 is a block diagram of an illustrative third party service that is capable of obtaining user location data from a location provider service, such as that shown in FIG. 2.

FIG. 3 is a block diagram of an illustrative third-party service, such as one of the third party services 110 of FIG. 1. The third party service 110 may be configured as any suitable computing device capable of implementing functionality the service is designed to perform and to obtain location information for a location provider, such as location provider 108. In the case of the restaurant third-party service 110(N), for example, the computing device should be configured to obtain a user's location data from a location provider, and notify the user when he or she is nearby one or more predetermined restaurants, such as restaurant 118. By way of example and not limitation, suitable computing devices may include personal computers (PCs), servers, server farms, datacenters, combinations of these, or any other computing device(s) capable of storing and executing all or part of the third-party service.

In one illustrative configuration, the third party service 110 comprises one or more processors 302 and memory 304. The location provider 108 may also contain communications connection(s) 306 that allow the third party service 110 to communicate with client devices 106 and 122, location provider 108, authentication authority 116, and/or other devices on the network 102. The third party service 110 may also include one or more input devices 308, such as a keyboard, mouse, pen, voice input device, touch input device, etc., and one or more output devices 310, such as a display, speakers, printer, etc. coupled communicatively to the processor(s) 302 and memory 304.

The memory 304 may store program instructions that are loadable and executable on the processor(s) 302, as well as data generated during the execution of and/or usable in conjunction with these programs. In the illustrated example, memory 304 stores an operating system 312, a third party service module 314, an account database 316, and optionally one or more other databases 318 usable to implement the functionality of the third-party service 110. The operating system 312 provides basic system functionality of the third-party service 110 and, among other things, provides for operation of the other programs and modules of the third-party service 110.

The third-party service module 314 further includes a profile module 320, an authentication module 322, third-party functionally module(s) 324, and a location module 326. In distributed implementations, third-party service module 314 (and each of its constituent modules) may serve as a backend, which interfaces with a counterpart front end third-party application 114 at the client device 104. However, in purely web-based implementations, the third-party service module 314 may perform all the functions of the third-party service, thereby obviating the need for the client side third-party application 114 entirely. In that case, the third-party service module 314 may be configured to render user interface screens, and to serve those screens to a browser of the client device 104 via the network 102.

When an account is created with the third-party service 110, the profile module 320 creates a user profile and stores the profile in the account database 316. The user profile may include login information of the user, in which case authentication module 322 establishes the login information for the user of the account and stores the login information in the account database 316 along with the user profile. When a user attempts to access the third-party service 110, the authentication module 322 compares login credentials received from the user with the established login information of the user, to determine whether the user has permission to access the user's account. The authentication module 322 may further receive one or more authentication credentials usable to access location data of the user from a location provider. In that case, such authentication credentials are stored in the user's profile for use by the third-party service 110 to obtain location data of the user from the location provider 108.

The third-party functionality module(s) 324 comprise any number of modules to implement the functionality the third-party service 110 is configured to perform. In the case of the map third-party service 110(1), the third-party functionality module(s) 324 may be configured to, among other things, obtain a user's location from a location provider, and to render the user's current location on a map. In the case of the photo third-party service 110(2), the third-party functionality module(s) 324 may be configured to, among other things, capture one or more images, obtain a user's location from a location provider, and tag the one or more images with the user's current location. In the case of the restaurant third-party service 110(N), the third-party functionality module(s) 324 may be configured to, among other things, obtain a user's location from a location provider, compare the user's current location with locations of one or more restaurants, and to notify the user when he or she is within a predetermined proximity of the one or more restaurants. In some implementations, the third-party functionality module(s) 324 may be further configured to obtain other information about the user, such as the user's social connections relative to location, schedule information, demographic information, or the like, in order to provide further functionality to the user.

The location module 326 is configured to query a location provider, such as location provider 108 to obtain location information of the user and to provide the user's location data to one or more other modules to facilitate the functionality of the third-party service 110.

Example Client Device

Figure 4:
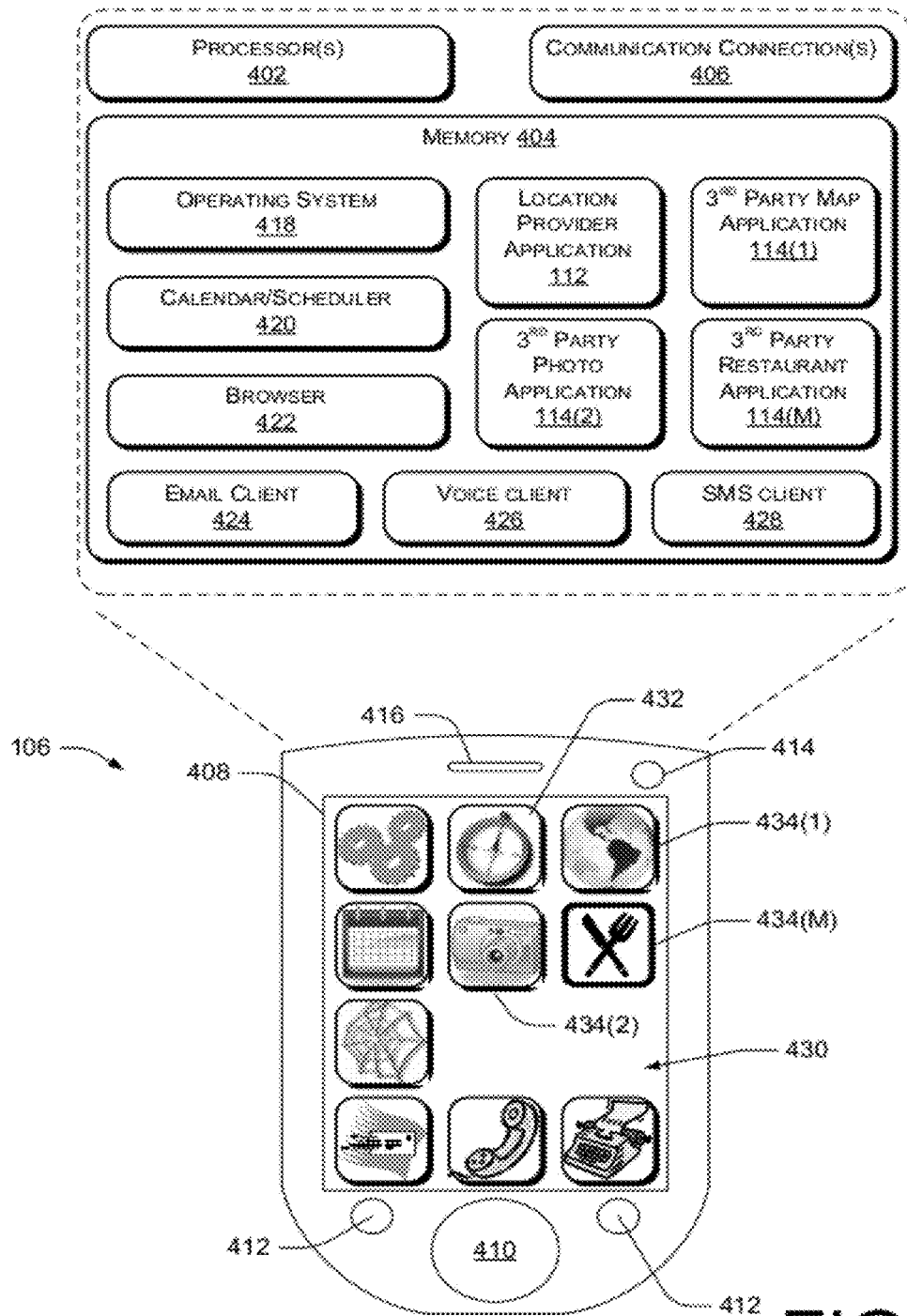
FIG. 4 is a schematic diagram of an illustrative user device capable of interacting with a location provider service and/or one or more third party services.

FIG. 4 is a block diagram of an illustrative client device 106 that may be used to interact with a location provider and one or more third-party services, such as the location provider 108 and third-party services 110 of FIG. 1. The client device 106 is illustrative of client devices used by users 104, 120, and any other users of one or more third-party services that interact with a location provider service. The client device 106 may be configured as any suitable computing device capable of interacting with and/or partially implementing a location-based notification service. By way of example and not limitation, suitable computing devices may include personal computers (PCs), laptops, net books, mobile telephones, Smartphones, home telephones, personal data assistants (PDAs), tablet PCs, set top boxes, or any other device capable of interacting with and/or partially implementing a location provider service and/or a third-party service.

In one illustrative configuration, the client device 106 comprises one or more processors 402 and memory 404. Memory 404 may store program instructions that are loadable and executable on the processor(s) 402, as well as data generated during or used in connection with execution of these programs.

The client device 106 may also contain communications connection(s) 406 that allow the client device 106 to communicate with the location provider 108, the third-party services 110, and/or other computing devices on the network 102. The client device 106 may also include input devices, such as a keyboard, mouse, pen, voice input device, touch input device, etc., and output devices, such as a display (e.g., screen or projector), speakers, printer, etc. coupled communicatively to the processor(s) 402 and memory 404. In the example shown in FIG. 4, the client device 106 includes a touch screen display 408 which serves as both an input and an output, a thumb pad 410 input, a pair of input buttons 412, a camera 414, and a speaker 416. However, numerous other inputs and output configurations are also possible.

Turning to the contents of the memory 402 in more detail, the memory 402 may include an operating system 418, a calendaring or scheduling application 420, a browser 422, an email client 424, a voice client 426, and a text messaging or short message service (SMS) client 428. The operating system 412 provides basic system functionality of the client device 106 and, among other things, provides for operation of the other programs and modules of the client device 106. The calendaring or scheduling application 420 may contain data and time information, event information, and/or schedule information of a user of the client device 106. The browser 422 may be any browser that allows access to a network, such as the Internet. The email client 424, voice client 426, and SMS client 428 provide email, voice, and text/multimedia messaging functionality, respectively.

The memory 402 may also include a location provider application 112 and one or more third-party applications 114, which provide front end interfaces for a backend location provider 108 and backend third-party services 110, respectively. However, as noted above, in some implementations (e.g., web-based services) the location provider application 112 and third party applications 114 may be omitted entirely. Also in other implementations (e.g., client based services) the third party applications 114 may provide substantially all of the functionality of the third-party service without the need for any remote, backend service. In the illustrated example, however, the location provider application 112 and three third-party applications 114, namely a third party map application 114(1), a third party photo application 114(2), and a third party restaurant application 114(M) are stored in the memory. Any or all of the location provider application 112 and the third-party applications 114 may be pre-installed on the client device 106 prior to the user obtaining the device, or may be installed after the user obtains the client device 106. Because, as noted above, some third-party services may be web-based, others may be client-based, and still others may include both web-based and client-based aspects, the number M of third-party applications 114 stored in memory 404 may or may not be the same as the number N of third-party services that the user employs. The location provider application 112 and third party applications 114(1), 114(2), and 114(M) are represented on a user interface 430 on the display 408 of the client device 106 at 432, 434(1), 434(2), and 434(M), respectively. The user may launch the respective application, in this example, by touching the corresponding representation of the application on the user interface 430.

For example, launching the location provider application 112 may result in a user interface being displayed to the user to allow the user to create an account, provide/update a profile of the user, or otherwise control how the location provider 108 is to manage dissemination of the user's location data.

Example User Profile

FIG. 5 is a schematic diagram of an illustrative user profile 500 that may be stored in, for example, the profile database 216 of location provider 108. In the illustrated example, the profile 500 includes authentication information 502, preferences 504, visibility profiles 506, and authorization information 508. However, in other examples, any or all of these pieces of information may be stored in separate files and or databases.

The authentication information 502 includes personal information of a user of the account, such as user name, password, and contact information, for example. Other authentication information, such as a certificate, token, biometric signature, or other security credentials may additionally or alternatively be stored. The authentication information 502 is compared to authentication credentials received by the location provider 108 to determine whether a requesting entity (e.g., user or third-party service) has permission to access location data of the user.

The preferences 504 include user settings that dictate what user information the location provider 108 has access to and how such information is to be obtained. For example, in the illustrated profile 500, the preferences include a schedule preference 510, a social connections preference 512, and location tracking settings 514.

The schedule preference 510 indicates whether and by what mechanism the location provider 108 has access to user schedule information. The schedule information may indicate, among other things, times that the location provider is allowed to track the user's location, times that the location provider is prohibited from tracking the user's location, times that the user plans to be at certain locations, people the user plans to be with at certain times and locations, and the like. In the illustrated example, the user has given the location provider 108 permission to obtain schedule information of the user by synching with a calendaring application of the user (e.g., calendar/scheduler 420). Alternatively, the user could create a custom calendar for use with the location provider 108.

The social connection preference 512 allows the user to specify which, if any, social connections the location provider is allowed to access. Granting the location provider 108 access to social connections allows the location provider to, among other things, identify individuals of interest to the user. If the location provider 108 has explicit or implicit permission to access location information of the social connections, then the location provider 108 may also be able to provide person-to-person proximity notification and/or notification when events involving the social connection occur. In the illustrated example, the user profile indicates that the location provider is allowed to access the user's contacts (e.g., from an address book), a first social networking site, and a second social networking site, but is not allowed to access the user's call logs, email logs, or SMS logs.

The location tracking settings 514 specify when and how the location provider 108 is to obtain location information about the user. For example, the location tracking settings 514 may determine how frequently the location provider 108 checks for the location of the user and/or in response to what events the location provider 108 checks for the location of the user. In the illustrated example, the location tracking settings 514 specify that the location provider 108 is to check for the user's location every 30 minutes, in response to every handoff from one cell tower to another, in response to the user requesting to turn the device on or off, and in response to the user launching an application that employs user location data (e.g., location provider application 112 and/or third-party applications 114).

As discussed above, during and after setting up an account with the location provider, the user is allowed to create one or more visibility profiles 506, which dictate what information is to be shared with third-party applications and under what conditions (time, location, etc.). In the illustrated example, the user has established two visibility profiles, a high visibility profile 516 and a low visibility profile 518. Details of the visibility profile can be viewed by selecting an expand/collapse control associated with each visibility profile. The high visibility profile 516 is expanded in FIG. 5 to show details of the high visibility profile 516. Specifically, the high visibility profile 516 specifies that the location provider 108 is to always share location information with third-party services, except at specified locations and specified times. These specified locations and times may be added to a black list (not shown) stored in the profile 500 or elsewhere. Additionally, or alternatively, the times and/or locations may be specified in the user's calendar, for example. The user also has the option to "always" provide location data, "never" provide location data, "always ask" before providing location data, or "never [provide location data], except at specified locations and/or specified times." In the last instance, the user may identify one or more locations and/or times to be added to a white list (also not shown), or the times and/or locations may be specified in the user's calendar, for example. The high visibility profile 516 further specifies that the location provider 108 is to share approximate location data (e.g., based on cell tower), more precise coordinate location data (e.g., from a GPS receiver of the client device), proximity data, all social connections to which the location provider has access, preferred locations of the user, and demographic data of the user.

The low visibility profile 518 is shown in a collapsed state, but includes all of the same options as the high visibility profile 516, but with a more limited amount of information to be provided to third-party services.

Authorization information 508 specifies one or more third-party applications that have permission to obtain location data of the user and a visibility profile applicable to each third-party application, which defines a portion of the location data of the user that the respective third-party application has permission to obtain.

Illustrative Event Information

Figure 6:
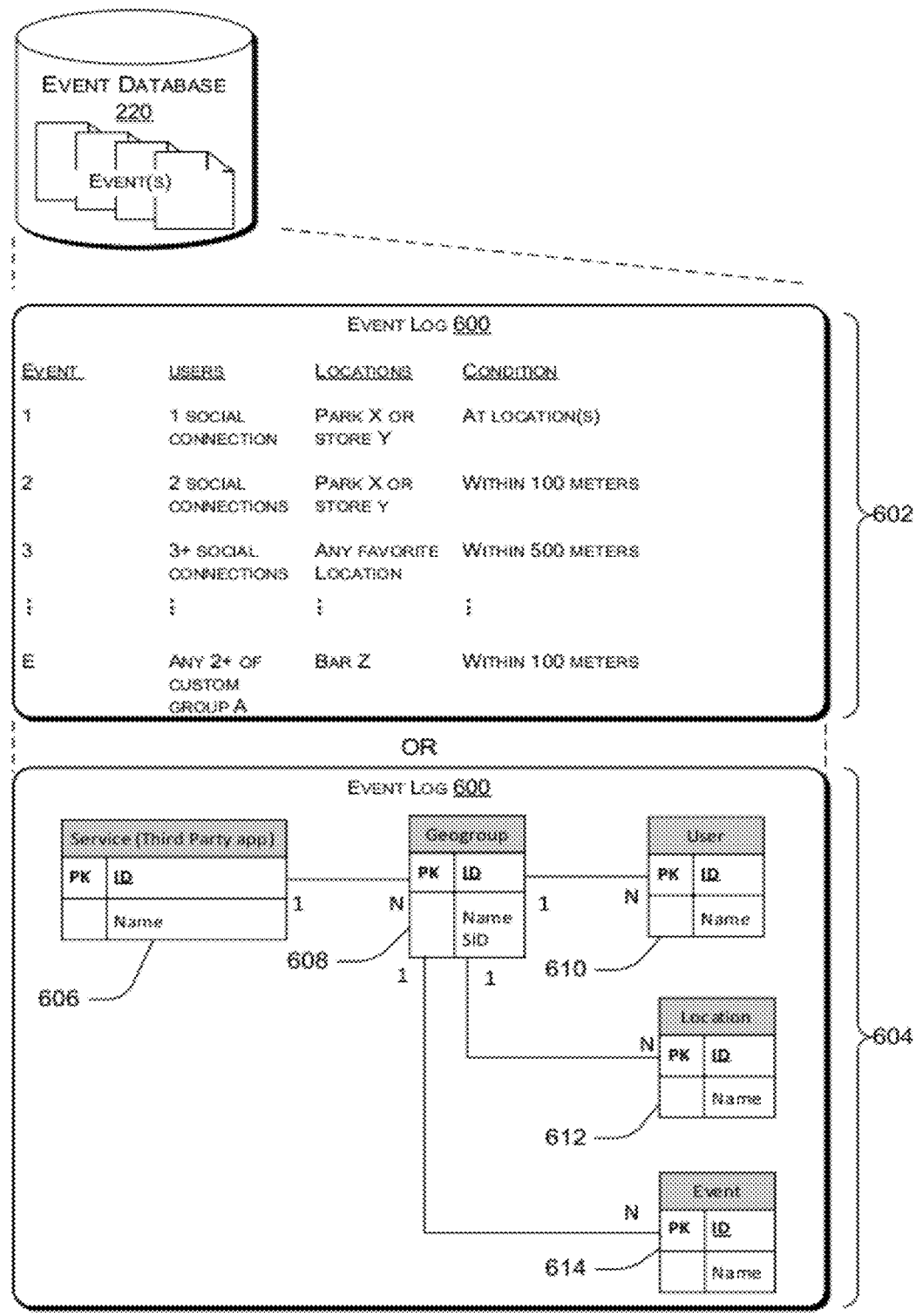
FIG. 6 is a schematic diagram of an illustrative event log that may be stored in an event database of a location provider, and which maintains events to which third party services can subscribe.

FIG. 6 is a schematic diagram of an illustrative event log 600 that may be stored in, for example, the event database 220 of location provider 108. In the illustrated example, the event log 600 may be stored in a flat (or denormalized) format 602, in which each event comprises an entry in the event log, a logical (or normalized) format 604 in which events are defined as child nodes of a geogroup, and/or any other desired database format. In the illustrated example, events are shown in both the flat format 602 and the logical format 604 for ease of illustration. However, in practice events need only be stored in one format.

In the flat format 602, events 1, 2, 3, . . . and E are each shown as an entry in the event log 600. Each event specifies one or more users, one or more locations, and one or more conditions. The conditions relate to the specified users and/or locations. For example, event log 600 depicts a number of events for a first user (as indicated by a user identifier, not shown). Event 1 will occur when one of the first user's social connections is at Park X or Store Y, "at" being defined as within a relatively small proximity of the location. Event 2 will occur when two of the first user's social connections are within 100 meters of Park X or Store Y, and event 3 will occur when any three or more of the first user's social connections are within 500 meters of any favorite location. Events 1-3 illustrate an observation that the location provider system 108 may be more confident of the social connections' actual locations as the number of social connections increases, thereby allowing the proximity condition to be relaxed as the number of social connections increases. Additionally, when multiple social connections are at a location, different notification criteria may be appropriate. For example, a user may wish to be notified by voice telephone call and/or text message when multiple social connections are present, whereas when only one social connection is present the user may prefer to be notified using a less immediate/invasive form of communication (e.g., email).

Event E will occur when any two users of a custom group A (e.g., a subset of the first user's social connections) are within 100 meters of Bar Z. Event E illustrates another way in which users may be specified for an event. When the conditions of an event are met, any third-party services subscribed to the event will be notified.

Each of the social connections/custom group memberships for the first user may be identified based on additional data stored in separate data stores, such as separate user, group, and/or user-group junction tables. For read performance or other benefits, these relationships may be further denormalized, thereby resulting in a single record for each social connection. Logical format 604 describes the events in a more normalized fashion, and eliminates the redundancy of data needed for the flat format 602. Rather than providing a separate event entry for each event, the event log 600 in the logical format 604 is organized first by third-party service 606. Each third-party service may be associated with one or more geogroups 608, and each geogroup may include one or more users 610, locations 612, and events 614. When the users 610 and locations 612 specified in the geogroup meet the events 614 specified in the geogroup, any third-party services subscribed to the event will be notified.

By way of specific example, a geogroup may have three users (U1, U2, and U3), two locations (L1 and L2), and two events (E1 and E2). E1 may specify criteria of any two users within 100 meters of a location and any three users within 1000 meters of a location. These rules may represent events such as "when two friends are right next to a restaurant, let those two know, but whenever three friends are in the same part of town, let them know." Additional users, locations, and events may be added to the geogroup, allowing for flexible location notification management.

Computer-Readable Media

Depending on the configuration and type of computing device used, memory 204 of the location provider 108, memory 304 of the third-party services 110, and/or memory 404 of the client device 104 may include volatile memory (such as random access memory (RAM)) and/or non-volatile memory (such as read-only memory (ROM), flash memory, etc.). Memories 204, 304, and 404 may also include additional removable storage and/or non-removable storage including, but not limited to, flash memory, magnetic storage, optical storage, and/or tape storage that may provide non-volatile storage of computer readable instructions, data structures, program modules, and other data for the location provider 108, third party services 110, and client devices 106 and 122, respectively.

Memories 204, 304, and 404 are examples of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Illustrative Process of Managing User Location Data

Figure 7:
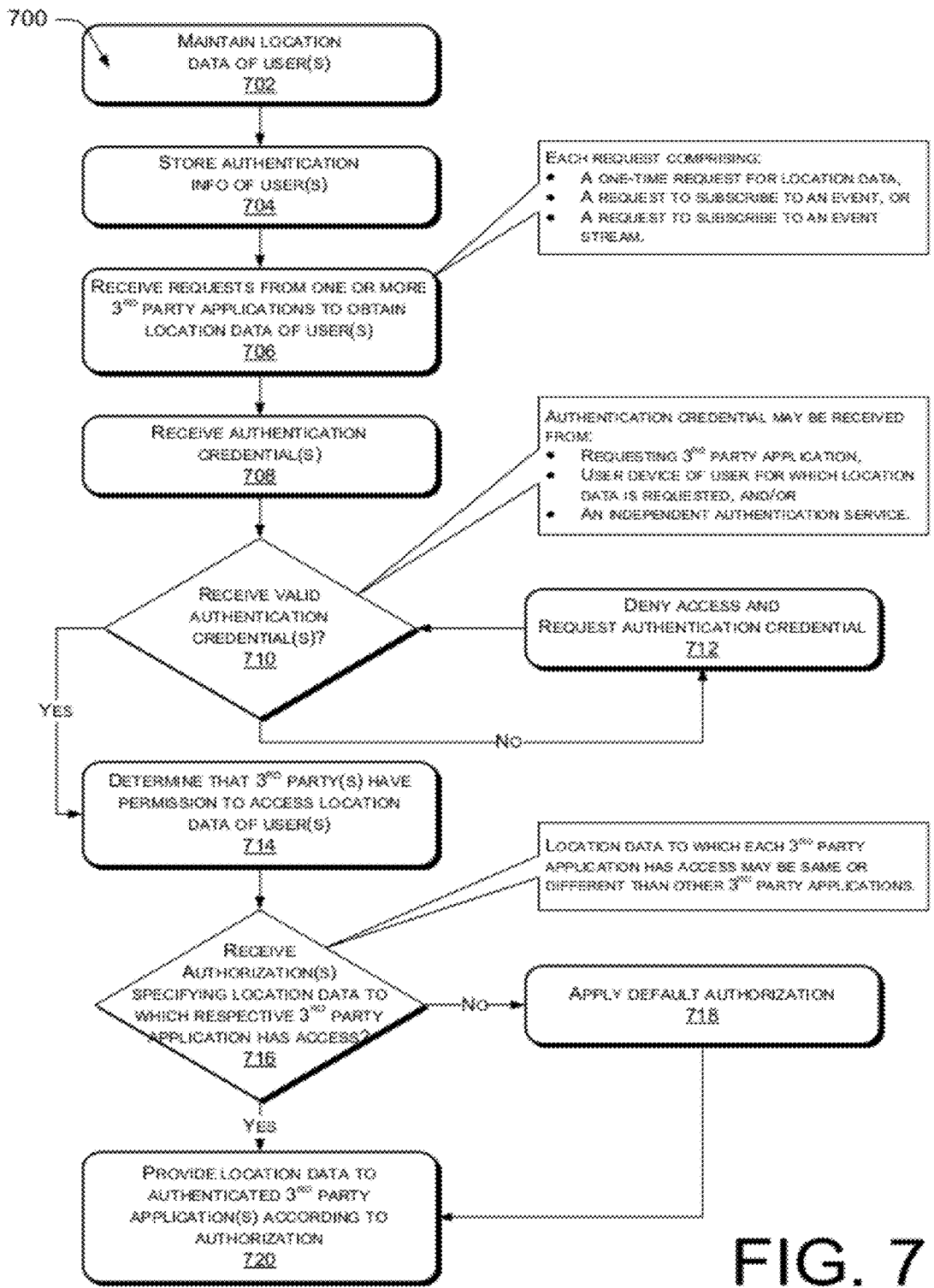
FIG. 7 is a flowchart showing an illustrative process of managing location information by a location provider.

FIG. 7 is a flowchart showing an illustrative method 700 of managing location information by a location provider. The method 700 may, but need not necessarily, be implemented using the location provider 108 of FIG. 1. For convenience, the method 700 is described below in the context of the location provider 108 and environment 100 of FIG. 1. However, the method 700 is not limited to performance in this environment.

In the illustrated implementation, the method 700 begins at 702 with the location provider 108 maintaining location data of one more users. The location data may be received from a cellular or other network service provider (not shown), and/or from a GPS receiver of the client device 106, for example. The received location data may then be stored in, for example, the location database 218.

At 704, the location provider 108 stores authentication information of the user (e.g., when the user creates an account with the location provider, or subsequently) in, for example, profile database 216.

At 706, the location provider 108 receives a request from a third-party application, such as third-party applications 110, to obtain location data of the user. As discussed above, the request may comprise a one-time request for location data, or a request to subscribe to an event or a stream of events. Then, at 708, the location provider 108 receives an authentication credential. The authentication credential may be received from the requesting third-party application, from a user device of the user for which location data is being requested, and/or from an independent authentication service.

Then, at 710, the location provider 108 determines whether the received authentication credential is valid. If the received credential is found to be invalid or is not received properly, at 712 the location provider 108 may deny access to the location data of the user and/or may request a valid authentication credential. If, at 710, the authentication credential is found to be valid, at 714 the location provider 108 determines, based at least in part on receipt of the authentication credential, that the third-party application has permission to access at least a portion of the location data of the user.

At 716, the location provider determines whether an authorization has been received for the third-party application. If not, at 718, the location provider 108 may apply a default authorization setting providing a default visibility profile (e.g., always visible). Otherwise, at 716, the location provider determines that an authorization has been received specifying a portion of the location data of the user that the third-party application has permission to obtain. For example, the authorization may specify, among other things, that the third-party application has permission to obtain location data of the user at one or more specified times, has permission to obtain location data of the user at one or more specified locations, has permission to obtain location data having a predetermined level of accuracy, is prohibited from obtaining information data of the user at one or more specified times, and/or is prohibited from obtaining information data of the user at one or more specified locations. Operations 706-720 may be repeated for any number of third-party applications, and location data to which each of the third-party applications has access may be the same or different than other third-party applications.

Then, at 720, the location provider provides at least a portion of the location data of the user to the third-party application in accordance with the received authorization or the default authorization.

Illustrative Process of Obtaining User Location Data

Figure 8:
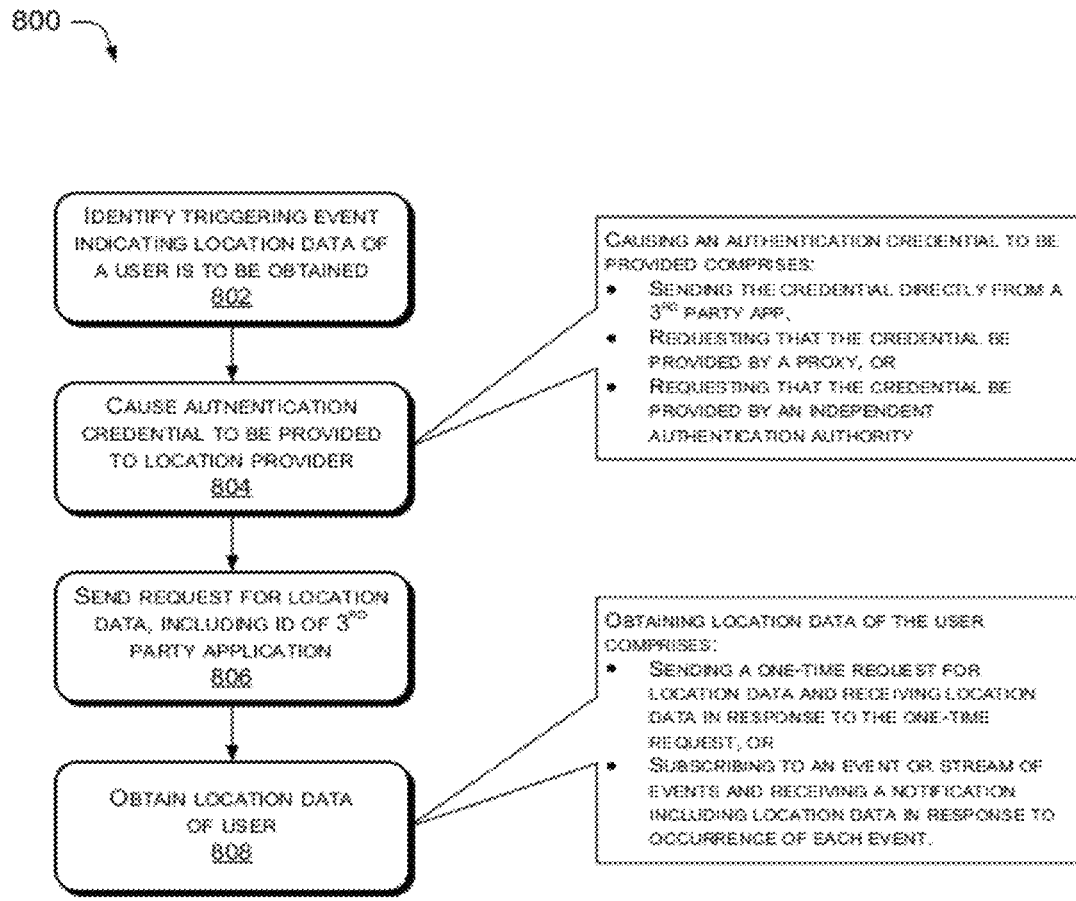
FIG. 8 is a flowchart showing an illustrative process of obtaining location information from a location provider.

FIG. 8 is a flowchart showing an illustrative method 800 of obtaining location information from a location provider. The method 800 may be implemented at least in part by a third-party application executing on one or more computing devices. In one implementation, the one or more computing devices comprise a portable electronic device and the third-party application comprises a client application executing on the portable electronic device. In another implementation, the one or more computing devices comprise a backend server and the third-party application comprises a web service hosted on the backend server. In yet another implementation, the one or more computing devices comprise a portable electronic device in communication with a backend server, and the third-party application comprises a web service hosted on the backend server and served to a client application executing on the portable electronic device.

Specifically, the method 800 may, but need not necessarily, be implemented by one of the third-party services 110, third party applications 114, or both, of FIG. 1. However, the method 800 is not limited to performance in this environment.

In the illustrated implementation, the method 800 begins at 802 with the third party application identifying a triggering event indicating that location data of a user is to be obtained. The triggering event may be any action indicating to the third party application that it should obtain location data of the user. Depending on the specific third-party service, examples of triggering events include a schedule time to check the location information (e.g., every 5 minutes, every half hour, etc.), upon launch of the third-party service, upon receipt of selection of a user interface control (e.g., control to refresh user location on a map, control to capture an image, etc.), or any other indication to check the user location data.

At 804, the third party application causes an authentication credential to be provided to a remote location provider. The authentication credential indicates that the one or more computing devices has permission to access at least a portion of the location data of the user. Causing the authentication credential to be provided to the remote location provider may comprise sending the authentication credential from the third-party application executing on the one or more computing devices to the remote location provider. Alternatively, causing the authentication credential to be provided to the remote location provider may comprise requesting that the authentication credential be sent to the remote location provider via a proxy executing on the one or more computing devices. In yet another alternative, causing the authentication credential to be provided to the remote location provider comprises requesting that the authentication credential be sent from an independent authentication authority to the remote location provider.

Then, at 806, the third-party application sends a request for location data of the user to the location provider 108. The request may include an identifier of the third-party application making the request. At 808, the third-party application obtains from the remote location provider 108 at least a portion of the location data of the user to which the third-party application has permission to access. Obtaining location data of the user may comprise sending a one-time request for location data of the user to the remote location provider and, in response, receiving a response to the one-time request including at least a portion of the location data of the user from the remote location provider. Alternatively, obtaining location data of the user may comprise subscribing to an event or stream of events associated with location data of the user and, in response, receiving a notification including at least a portion of the location data of the user in response to occurrence of each event to which the third-party application subscribed.

Illustrative Process of Managing User Location Data

Figure 9:
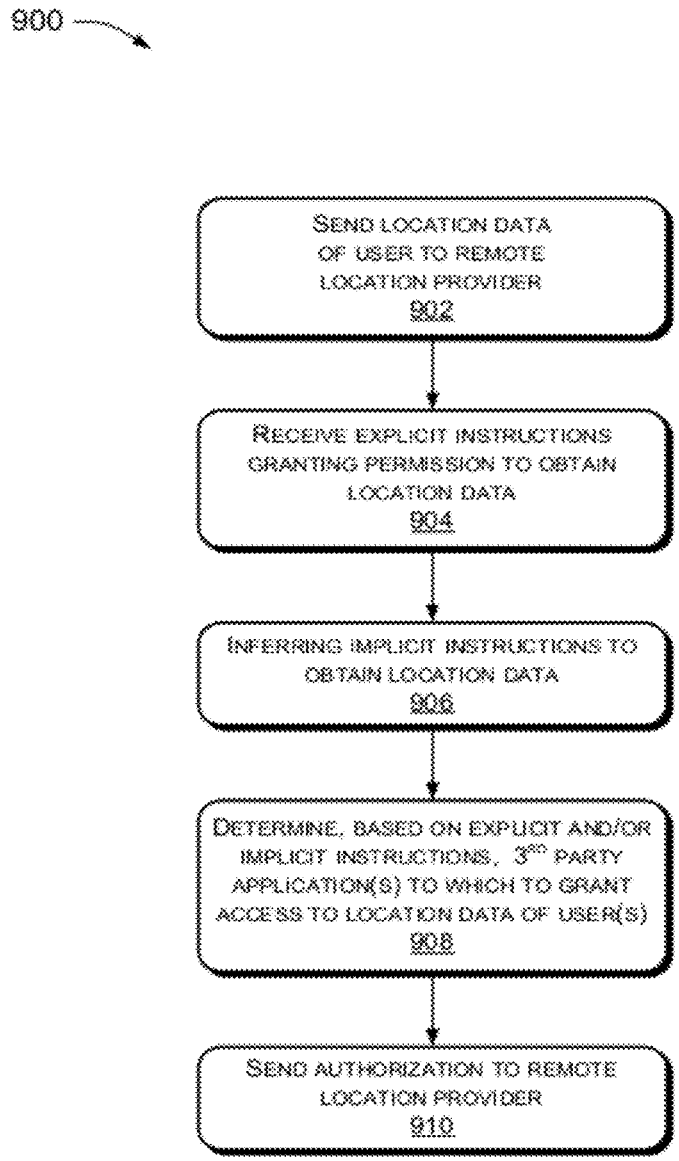
FIG. 9 is a flowchart showing an illustrative process of interacting with a location provider.

FIG. 9 is a flowchart showing an illustrative method 900 of interacting with a location provider. The method 900 may, but need not necessarily, be implemented using the location provider application 112 of FIG. 1. For convenience, the method 900 is described below in the context of the location provider application 112 and environment 100 of FIG. 1. However, the method 900 is not limited to performance in this environment.

The method 900 begins at 902 with the location provider application 112 sending location data of a user from the client device 106 to a remote location provider, such as location provider 108.

At 904, the location provider application 112 may receive explicit instructions from the user to grant the one or more third-party applications permission to obtain location data of the user and to specify, for each third-party application, a portion of the location data of the user that the respective third-party application has permission to obtain. Additionally or alternatively, at 906, the location provider application 112 may receive implicit instructions inferred from previous explicit grants of permission by the user.

At 908, the location provider application 112 determines one or more third-party applications to which to grant permission to obtain the location data of the user. The determination may be made based on the explicit instructions and/or the implicit instructions received.

Then, at 910, the location provider application 112 sends an authorization to the remote location provider 108. The authorization may specify the one or more third-party applications that have permission to obtain location data of the user and, for each third-party application, a portion of the location data of the user that the respective third-party application has permission to obtain.

Illustrative systems and methods of managing dissemination of location information are described above. The illustrative methods are illustrated as a collection of blocks in a logical flow graph representing a sequence of operations that can be implemented in hardware, software, firmware, or a combination thereof. Certain features of the systems and acts of the methods need not be arranged in the order described, may be modified, and/or may be omitted entirely, depending on the circumstances. Also, any of the acts described above with respect to any method may be implemented by a processor or other computing device based on instructions stored on one or more computer-readable storage media.

CONCLUSION

Although the disclosure uses language specific to structural features and/or methodological acts, the invention is not limited to the specific features or acts described. Rather, the specific features and acts are disclosed as illustrative forms of implementing the invention.

What is claimed is:

1. A method implemented at least in part by a client application executing on one or more computing devices, the method comprising:
   identifying a triggering event indicating that location data of a user device is to be obtained, wherein the user device comprises one of a first computing device of the one or more computing devices or a device different from the one or more computing devices;

in response to identifying the triggering event, causing an authentication credential to be provided to a remote location provider, the authentication credential indicating that the client application has permission to access at least a portion of the location data of the user device;

obtaining, from the remote location provider, the portion of the location data that the client application has permission to access; and notifying a user of a presence of one or more social connections of the user in a form of communication based on a number of the one or more social connections of the user that are present within a predetermined proximity of a location indicated by the portion of the location data that the client application has obtained from the remote location provider.

2. The method of claim 1, wherein the one or more computing devices comprise a portable electronic device and the client application is executed on the portable electronic device, and wherein the portable electronic device comprises one of the user device or a device different from the user device.

3. The method of claim 1, wherein the one or more computing devices comprise a backend server and the client application interacts with a web service hosted on the backend server.

4. The method of claim 1, wherein the one or more computing devices comprise a portable electronic device in communication with a backend server, and the client application interacts with a web service hosted on the backend server, the portable electronic device comprising one of the user device or a device different from the user device.

5. The method of claim 1, wherein causing the authentication credential to be provided to the remote location provider comprises sending the authentication credential from the client application executing on the one or more computing devices to the remote location provider.

6. The method of claim 1, wherein causing the authentication credential to be provided to the remote location provider comprises requesting that the authentication credential be sent to the remote location provider via a proxy executing on the one or more computing devices.

7. The method of claim 1, wherein causing the authentication credential to be provided to the remote location provider comprises requesting that the authentication credential be sent from an independent authentication authority to the remote location provider.

8. The method of claim 1, wherein obtaining the portion of the location data comprises:

sending a one-time request for the location data of the user device to the remote location provider; and receiving, from the remote location provider, a response to the one-time request, the response including the portion of the location data of the user device.

9. The method of claim 1, wherein obtaining the portion of the location data comprises:

subscribing to an event or stream of events associated with the location data of the user device; and receiving a notification including the portion of the location data of the user device in response to occurrence of each event to which the client application subscribed.

10. One or more computer storage media storing executable instructions that, when executed by client application running one or more computing devices, cause the client application to perform acts comprising:

identifying a triggering event indicating that location data of a user device is to be obtained, wherein the user device comprises one of a first computing device of the one or more computing devices or a device different from the one or more computing devices;

in response to identifying the triggering event, causing an authentication credential to be provided to a remote location provider, the authentication credential indicating that the client application has permission to access at least a portion of the location data of the user device;

obtaining, from the remote location provider, the portion of the location data that the client application has permission to access; and notifying a user of a presence of one or more social connections of the user in a form of communication based on a number of the one or more social connections of the user that are present within a predetermined proximity of a location indicated by the portion of the location data that the client application has obtained from the remote location provider.

11. The one or more computer storage media of claim 10, wherein the one or more computing devices comprise a portable electronic device and the client application is run on the portable electronic device, and wherein the portable electronic device comprises one of the user device or a device different from the user device.

12. The one or more computer storage media of claim 10, wherein the one or more computing devices comprise a backend server and the client application interacts with a web service hosted on the backend server.

13. The one or more computer storage media of claim 10, wherein the one or more computing devices comprise a portable electronic device in communication with a backend server, and the client application interacts with a web service hosted on the backend server, the portable electronic device comprising one of the user device or a device different from the user device.

14. The one or more computer storage media of claim 10, wherein causing the authentication credential to be provided to the remote location provider comprises one of:

sending the authentication credential from the client application executing on the one or more computing devices to the remote location provider;

requesting that the authentication credential be sent to the remote location provider via a proxy executing on the one or more computing devices; or requesting that the authentication credential be sent from an independent authentication authority to the remote location provider.

15. The one or more computer storage media of claim 10, wherein obtaining the portion of the location data comprises:

sending a one-time request for the location data of the user device to the remote location provider; and receiving, from the remote location provider, a response to the one-time request, the response including the portion of the location data of the user device.

16. The one or more computer storage media of claim 10, wherein obtaining the portion of the location data comprises:

subscribing to an event or stream of events associated with the location data of the user device; and receiving a notification including the portion of the location data of the user device in response to occurrence of each event to which the client application subscribed.

17. A computing device comprising:

one or more processors;

memory; and a client application stored in the memory and executable by the one or more processors to perform acts comprising:

identifying a triggering event indicating that location data of a user device is to be obtained, wherein the user device comprises one of the computing device or a device different from the computing device;

in response to identifying the triggering event, causing an authentication credential to be provided to a remote location provider, the authentication credential indicating that the client application has permission to access at least a portion of the location data of the user device;

obtaining the portion of the location data that the client application has permission to access from the remote location provider; and notifying a user of a presence of one or more social connections of the user in a form of communication based on a number of the one or more social connections of the user that are present within a predetermined proximity of a location indicated by the portion of the location data that the client application has obtained from the remote location provider.

18. The computing device of claim 17, wherein causing the authentication credential to be provided to the remote location provider comprises one of:

sending the authentication credential from the client application to the remote location provider;

requesting that the authentication credential be sent to the remote location provider via a proxy executing on the computing device; or requesting that the authentication credential be sent from an independent authentication authority to the remote location provider.

19. The computing device of claim 17, wherein obtaining the portion of the location data comprises:

sending a one-time request for the location data of the user device to the remote location provider; and receiving, from the remote location provider, a response to the one-time request, the response including the portion of the location data of the user device.

20. The computing device of claim 17, wherein obtaining the portion of the location data comprises:

subscribing to an event or stream of events associated with the location data of the user device; and receiving a notification including the portion of the location data of the user device in response to occurrence of each event to which the client application subscribed.

* * * * *